United States Patent
Kang

(10) Patent No.: US 7,686,872 B2
(45) Date of Patent: Mar. 30, 2010

(54) DEVICE FOR AND METHOD OF INFORMING REPLACEMENT TIME OF AIR FILTER

(75) Inventor: Boksun Kang, Daejeon-si (KR)

(73) Assignee: Hall Climate Control Corporation, Daejeon-Si (KR)

( * ) Notice: Subject to any disclaimer, the term of this patent is extended or adjusted under 35 U.S.C. 154(b) by 642 days.

(21) Appl. No.: 11/651,881

(22) Filed: Jan. 10, 2007

(65) Prior Publication Data

US 2007/0157819 A1    Jul. 12, 2007

(30) Foreign Application Priority Data

Jan. 12, 2006   (KR)  ............... 10-2006-0003536
Jan. 9, 2007    (KR)  ............... 10-2007-0002389

(51) Int. Cl.
*B01D 46/00*    (2006.01)
(52) U.S. Cl. .................. 96/417; 96/421; 55/385.3; 55/467; 55/DIG. 34
(58) Field of Classification Search .......... 96/417, 96/418, 419, 421, 424; 55/385.3, 467, DIG. 34
See application file for complete search history.

(56) References Cited

U.S. PATENT DOCUMENTS 6,991,674 B2 *  1/2006  Dietrich ............... 96/397

FOREIGN PATENT DOCUMENTS

KR    1996-0004754 A    2/1996
KR    100183622 B1    12/1998

* cited by examiner

*Primary Examiner*—Robert A Hopkins
(74) *Attorney, Agent, or Firm*—Fulbright & Jaworski L.L.P.

(57) ABSTRACT

The invention relates to a device for and a method of informing replacement time of an air filter, more particularly, to a device for and a method of informing replacement time of an air filter, in which the accumulation amount of the dust accumulated in the air filter is calculated based on the factors such as a contamination degree of the air introduced into the air filter, air introduction time, and air introduction volume, and then when the accumulation amount of the total dust in the air filter exceeds a reference value, a driver is informed of the replacement time of the air filter, so that it is possible to replace the air filter at an optimum instance to thereby maintain the pleasant interior circumstance of a vehicle, to prevent the dissipation of the expense caused by the unnecessary early replacement of the air filter, and to prevent the interior air contamination of the vehicle due to the delay of the replacement of the air filter, and the like.

17 Claims, 7 Drawing Sheets

Prior Art

Prior Art

Prior Art

DEVICE FOR AND METHOD OF INFORMING REPLACEMENT TIME OF AIR FILTER

BACKGROUND OF THE INVENTION

1. Field of the Invention

This application claims priority from Korean Patent Application No. 2006-3536 filed Jan. 12, 2006, and Korean Patent Application No. 2007-2389 filed Jan. 9, 2007, each of which are incorporated by reference in their entireties.

The invention relates to a device for and a method of informing replacement time of an air filter, more particularly, to a device for and a method of informing replacement time of an air filter, in which the accumulation amount of the dust accumulated in the air filter is calculated based on the factors such as a contamination degree of the air introduced into the air filter, an air introduction time, and an air introduction volume, and then when the accumulation amount of the total dust in the air filter exceeds a reference value, a driver is informed of the replacement time of the air filter, so that it is possible to replace the air filter at an optimum instance to thereby maintain the pleasant interior circumstance of a vehicle, to prevent the dissipation of the expense caused by the unnecessary early replacement of the air filter, and to prevent the interior air contamination of the vehicle due to the delay of the replacement of the air filter, and the like.

2. Background of the Related Art

In general, an air conditioning device for a vehicle is designed to introduce exterior/interior air of the vehicle and heat or cool it to thereby blow the air into the interior of the vehicle, resulting in the heating or cooling of the vehicle interior. As shown in FIG. 1, the vehicle air conditioning device comprises a blower provided with an exterior/interior air switching door 10 at the inside for selectively opening and closing an interior/exterior air inlet opening formed at an inlet side according to an interior/exterior air mode, and a blower driven by a motor for blowing the air introduced through the interior/exterior air inlet opening to an air conditioning case; an evaporator and a heater core disposed at the inside of the air conditioning case with a predetermined interval there-between; a temperature control door disposed between the evaporator and the heater core for controlling the volume of the air passing through the heater core; a mode door disposed at an outlet side of the air conditioning case for opening and closing a plurality of vents communicating with the interior of the vehicle; and an air filter disposed at the upstream of the blower.

Accordingly, if the user operates a predetermined operation unit 30 for controlling the air conditioning device, the control unit 28 selects the interior/exterior air conversion unit by controlling the position of the interior/exterior air switching door, controls the air introduction volume by controlling the blower motor or controls the positions of the temperature control door 20 and the mode door 24, or performs the temperature and various air conditioning modes.

In other words, in case of the interior air mode, the interior/exterior air switching door 23 is operated to open the interior air inlet opening 21 and close the exterior air inlet opening 22, and the interior air introduced through the interior air inlet opening 21 by means of the operation of the blower, passes through the air filter to be blown into the inside of the air conditioning case, and then it is introduced into respective vents with selectively passing through the heater core by means of the temperature control door and the mode door and is emitted into the inside of the vehicle.

In addition, in case of the exterior air mode, contrary to this operation, the interior/exterior air switching door 23 tightly closes the interior air inlet opening 21 and opens the exterior air inlet opening 22, and the exterior air introduced through the exterior air inlet opening 22 by means of the operation of the blower, passes through the air filter to be blown into the inside of the air conditioning case, and then it is introduced into respective vents with selectively passing through the heater core by means of the temperature control door and the mode door and is emitted into the inside of the vehicle.

In this regard, the air filter 16 disposed at the air conditioning device is operated to filter out the dust in the air to purify the air introduced through the interior/exterior air inlet openings. However, if it is used for a long time, the dust is concentrated to thereby increase the resistance of the air passing through the air filter 16 rapidly and cause the pollution of the air, so that it is necessary to change the air filter at a proper instance.

With regard to a conventional technology for exchanging the air filter at a proper time, there was disclosed a Korean Patent Application Laid Open No. 10-1996-0023728, in which a device for detecting the replacement time of the air filter was suggested. Referring now to FIGS. 2 and 3, the device for detecting the replacement time of the air filter is characterized by further comprising a blower motor driving means 46 for driving a blower motor of a blower, driving means 48 of suction air selection means disposed for the blower to suck the exterior air or the interior air selectively, display means 40 or alarming means 42 for informing the replacement time of the filter means, and control means for counting the driving time of the driving means 48 of the suction air selection means and the blower motor driving means 46 and informing the replacement time of the filter means to the alarming means, in addition to the vehicle air conditioning device with a filter, which includes a blower for blowing interior air or exterior air of a vehicle, an evaporator unit connected to an emitting opening of the blower.

Also, there was disclosed a method for detecting the replacement time of an air filter in an air conditioning device for a vehicle with filter, which is provided with a blower for blowing interior air or exterior air in a vehicle, an evaporator unit connected to an emitting opening of the blower, and filter means disposed at the inlet side of the evaporator unit, the method is characterized by comprising: a step S10 of accumulatively counting driving time of the blower, and a time for introducing the exterior air, a step S20 of determining whether or not the accumulative count time exceeds the respective predetermined exchange period by comparing the accumulatively counted driving time of the blower with a proper exchange period of the air filter predetermined after the driving of the blower, or comparing the accumulatively counted exterior air introduction time with a proper exchange period of the air filter after the driving of the blower, and a step S30 of informing the replacement time of the air filter or producing an alarming sound when any one of the two determinations exceeds the exchange period.

In other words, the conventional technique was directed to the detection of the replacement time of the air filter by comparing only the driving means of the suction air selecting means (holding time of the exterior air mode) and the blower motor driving means (blowing time) with the filter exchange period. Also, another conventional technique, which was disclosed in Korea Patent Laid Open No. 10-1996-0004754, was constructed to detect the replacement time of the air filter by sensing the speed of the blower motor, the load and the overload of the motor.

However, the conventional techniques have a problem that it was difficult to exchange the air filter accurately because they informed the replacement time regardless of the real amount of the dust accumulated in the air filter. In other words, since the accuracy of the replacement time of the air filter was reduced by the outer disturbing factors such as the difference of the pollution according to the driving area, and the overload due to the deterioration of the blower motor itself, and the like, there occurred problems that expense dissipation was caused due to unnecessary early exchange of the air filter and the occurrence of the air pollution in the vehicle due to delay of the exchange of the air filter.

SUMMARY OF THE INVENTION

Therefore, the present invention has been made in view of the above problems occurring in the prior art, and an object of the present invention is to provide a device for and a method of informing replacement time of an air filter, in which the accumulation amount of the dust accumulated in the air filter is calculated based on the factors such as a contamination degree of the air introduced in the air filter, an air introduction time, and an air introduction volume, and then when the accumulation amount of the total dust in the air filter exceeds a reference value, a driver is informed of the replacement time of the air filter, so that it is possible to exchange the air filter at an optimum instance to thereby maintain the pleasant interior circumstance of a vehicle, to prevent the dissipation of the expense caused by the unnecessary early exchange of the air filter, and to prevent the interior air pollution of the vehicle due to the delay of the exchange of the air filter, and the like.

To accomplish the above objects, according to the present invention, there is provided a device for informing replacement time for an air filter in an air conditioning device for a vehicle, which includes a blower provided with an exterior/interior air switching door at the inside to selectively open and close interior/exterior air inlet openings formed at the inlet side according to interior/exterior air modes, and a blower to blow the air introduced through the interior/exterior air inlet openings to a air conditioning case, and an air filter disposed at least one place of the upstream and downstream of the blower, wherein the device further comprises contamination degree information means for providing a contamination degree of air introduced into the air filter; air introduction time calculation means for calculating the time spent for the air to be introduced into the air filter; air introduction volume calculation means for calculating the volume of the air introduced into the air filter; indicating means for informing replacement time of the air filter; and a controller for calculating and integrating dust supply amount and dust accumulation amount of the air filter based on factors such as values provided from the contamination degree information means, the air introduction time calculation means, and the air introduction volume calculation means, and then informing the replacement time of the air filter by way of the indicating means when the total dust accumulation amount of the air filter exceeds a reference value.

Also, according to another aspect of the present invention, there is provided a method of informing replacement time for an air filter in an air conditioning device for a vehicle, which includes a blower provided with an exterior/interior air switching door at the inside to selectively open and close interior/exterior air inlet openings formed at the inlet side according to interior/exterior air modes, and a blower to blow the air introduced through the interior/exterior air inlet openings to a air conditioning case, and an air filter disposed at least one place of the upstream and downstream of the blower, wherein the method comprises the steps of determining whether the device is operated at an interior air mode or at an exterior air mode, when the vehicle is started and the air conditioning device is operated; determining whether the interior air mode is at an initial interior air mode or not after the operation of the blower, when the result of determination is that it is operated at the interior air mode, and determining whether the blower is operated at on state or at off state if the result of the determination is that it is operated at the exterior air mode; calculating and integrating the dust supply amount (n+1) introduced into the air filter and the dust accumulation amount (n+1) concentrated in the air filter by the following Expressions, after dividing the results of the determination into an initial interior air mode state and a non-initial interior air mode state in the interior air mode, a blower-on state and a blower-off state in the exterior air mode: dust supply amount (n+1)=contamination degree×air introduction time×air introduction volume, dust accumulation amount (n+1)=dust supply amount (n+1)×filter efficiency; calculating a total dust accumulation amount (n+1) written by the following Expression by the application of the calculated dust accumulation amount (n+1): total dust accumulation amount (n+1)=total dust accumulation amount (n)+dust accumulation amount (n+1); and informing replacement time of the air filter when the calculated total dust accumulation amount (n+1) exceeds a reference value.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings. Instantly, constructing elements identical with those of the conventional art will be explained with reference to the conventional drawings.

Figure 1:
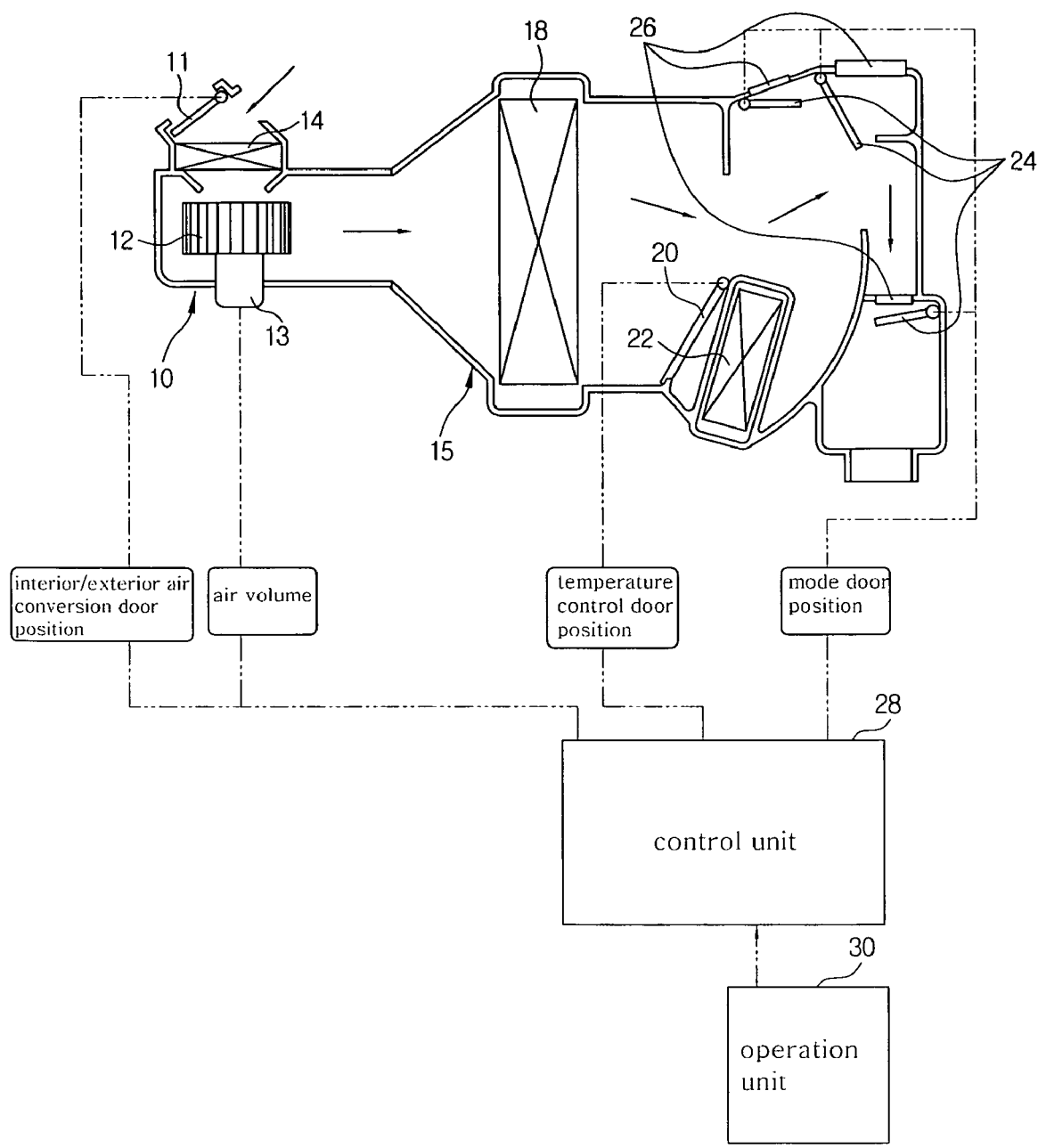
FIG. 1 is a schematic view showing an air conditioning device provided with a general air filter.
Figure 2:
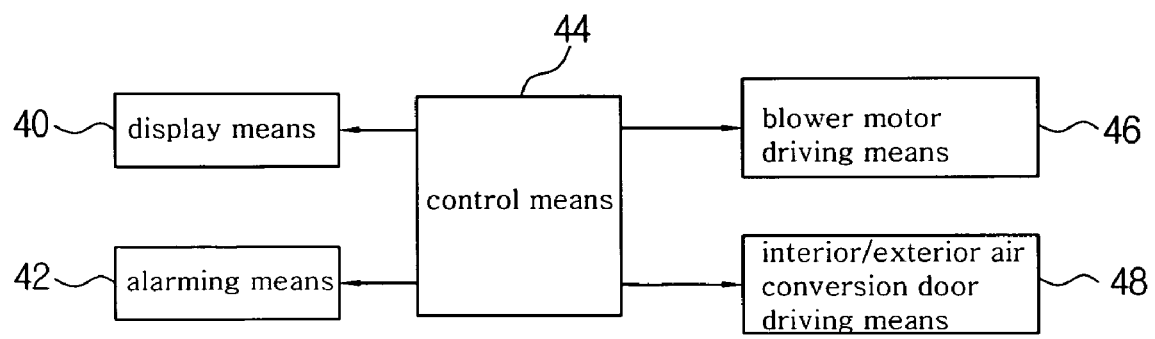
FIG. 2 is a block diagram showing a conventional detecting device of replacement time of an air filter.
Figure 3:
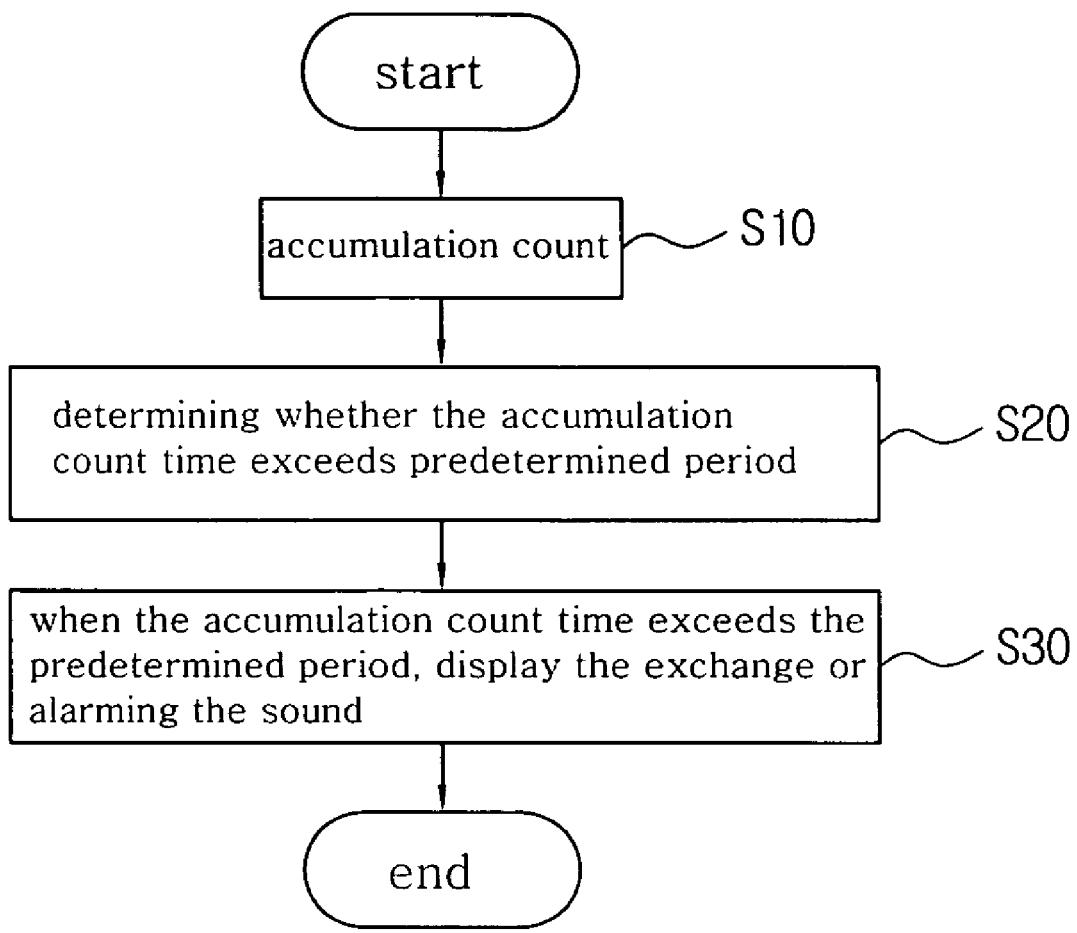
FIG. 3 is a flow chart showing a method for detecting replacement time of a conventional air filter.
Figure 4:
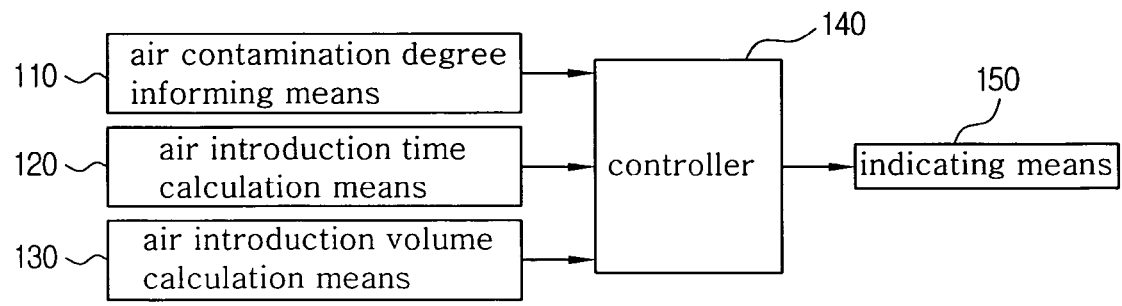
FIG. 4 is a block diagram showing a device for informing replacement time of an air filter according to the present invention.
Figure 5:
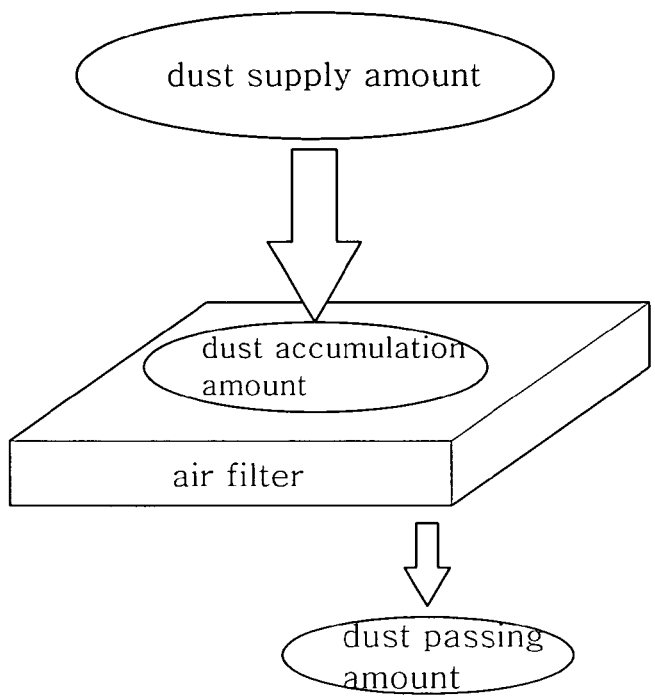
FIG. 5 is a view for explaining efficiency of the air filter in the device for informing replacement time of the air filter according to the present invention.
Figure 6:
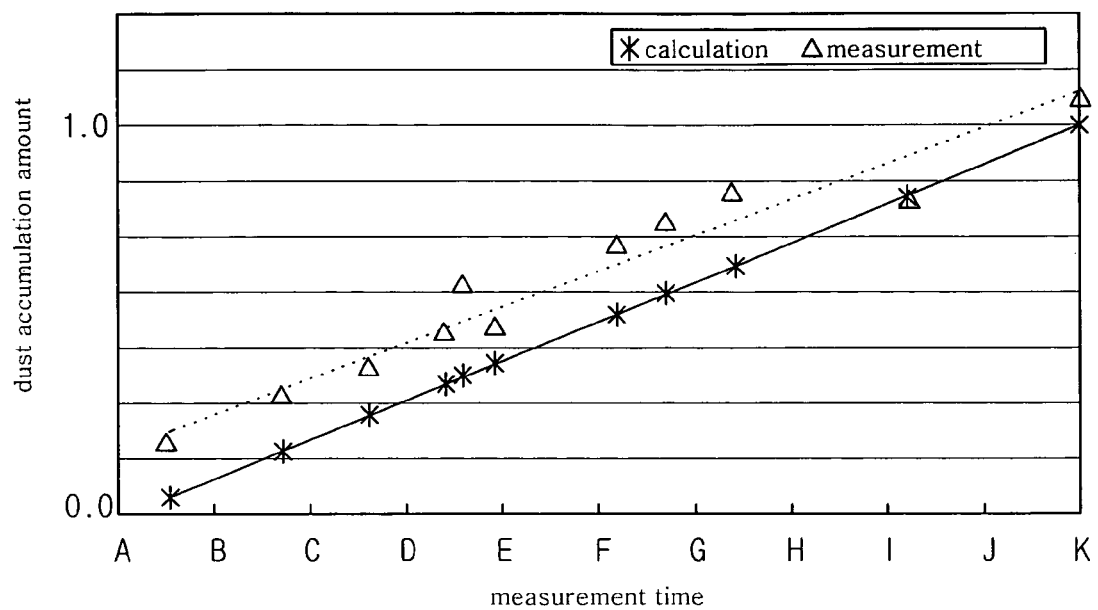
FIG. 6 is a graphic view showing comparisons between an accumulation amount of the dust in the air filter obtained by means of a calculation formula and an accumulation amount of the dust concentrated in the real air filter in the device for informing replacement time of the air filter according to the present invention.

FIG. 4 is a block diagram showing a device for informing replacement time of an air filter according to the present invention, FIG. 5 is a view for explaining efficiency of the air filter in the device for informing replacement time of the air filter according to the present invention, and FIG. 6 is a graphic view showing comparisons between an accumulation amount of the dust in the air filter obtained by means of a calculation formula and an accumulation amount of the dust concentrated in the real air filter in the device for informing replacement time of the air filter according to the present invention.

As shown in the drawings, the device for informing the replacement time of the air filter according to the present invention comprises an air contamination informing means 110, an air introduction time calculation means 120, an air introduction volume calculation means 130, a controller 140, and an indicating means 150.

At first, the air contamination informing means 110 functions to provide information about a contamination degree of the air introduced into an air filter 14.

Herein, the air contamination degree indicates weight of dust ($\mu g$) in a predetermined volume ($m^3$) of air and the air contamination degree can be measured by the application of the annual average atmospheric air contamination degree ($\mu g/m^3$) about a driving area. The data about the annual average atmospheric air contamination degree is previously stored in the memory. Accordingly, if it is necessary to be informed of the contamination degree of the air introduced the air filter 14, you may only search the data about the air contamination degree stored in the memory.

Meanwhile, the air contamination degree can be obtained also by direct input of a grade of the contamination degree from a driver, or it can be obtained by means of disposing a sensor at the upstream of the air filter 14 for measuring the air contamination degree.

In addition, the air introduction time calculation means 120 functions to calculate a time during which the air comes into the air filter 14.

In other words, it can be calculated by measuring a time from which the air starts to be introduced into the air filter 14. In this regard, it can be measured by counting an operation time of the blower 12 by means of a timer, and the like. When the air conditioning device is at an exterior air mode with turning off the blower 12, it can be measured by counting driving time at the exterior air mode with turning off the blower 12.

Herein, the reason of measuring the operation time of the blower 12 to calculate the time during which the air introduced into the air filter 14 is because, when the blower 12 is once operated, the air starts to be introduced into the air filter 14, so that the whole air introduction time can be measured by the continuous counting of the operation time of the blower 12.

Furthermore, the reason of counting the driving time of the blower, which is operated at an off state and at the exterior air mode, in order to calculate the time of the air introduced into the air filter 14, is because when the blower 12 is operated at the exterior air mode with turning off the blower, the wind caused by the driving of the vehicle can be introduced into the air filter through the exterior air inlet opening, and the whole air introduction time can be obtained by the continuous counting of the driving time at the exterior air mode of the blower 12 with operating at the off state.

Also, the air introduction volume calculation means 130 is to calculate the air introduction volume of the air introduced into the air filter 14.

The air introduction volume can be calculated by applying the air introduction volume of the inlet side of the blower 12 when the blower 12 is turned on, and it can be calculated by applying the air introduction volume caused by the driving wind of the vehicle when the blower 12 is turned off and the air conditioning device is at the exterior air mode.

In this instance, since the air introduction volume at the inlet side of the blower 12 can be varied according to the number of the stage of the blower 12 and positions of the mode door 24 and the temperature control door 20, what is required is only to induce the data for the air introduction volume, which is previously stored in the memory, if it is intended to calculate the volume of the air introduced into the air filter 14 when the data of the air introduction volume based on the stage of the blower 12 and the data of the air introduction volume according to the positions of the mode door 24 and the temperature control door 20 are previously stored in the memory.

Also, since the air introduction speed and the air introduction volume caused by the driving wind can be varied according to the speed of the vehicle, when the volume of the air introduced into the air filter 14 is intended to be calculated, what is required is only to induce the data of the air introduction volume stored in the memory after storing the data of the air introduction volume of the driving wind according to the vehicle speed. In this regard, when the blower 12 is operated at the off state during the exterior air mode, it is possible to use the air introduction volume of 70 $m^3$/Hr(CMH), which is represented at the vent atmosphere as a fixed value of the air introduction volume due to the driving wind, which is required to calculate the volume of the air.

Meanwhile, although it is possible to induce the air introduction volume of the air from the memory, in which the data of the air introduction volume at the inlet side of the blower 12, and the data of the air introduction volume due to the driving wind was previously stored, it is possible to obtain it by calculating the air introduction volume based on a formula for calculating the air introduction volume.

In addition, the controller 140 is operated to inform the replacement time of the air filter 14 by means of the indicating means 150, when the total dust accumulation amount of the air filter 14 exceeds the reference value, after calculating and integrating the dust supply amount and the dust accumulation amount to the air filter 14 based on the values such as an air contamination degree, an air introduction time, and an air introduction volume, respectively provided from the air contamination informing means 110, the air introduction time calculating means 120, and the air introduction volume calculation means 130.

The indicating means 150 is operated to inform the replacement time of the air filter 14 of the driver when the controller 140 outputs the control signal because the total dust accumulation amount calculated in the controller 140 exceeds the reference value. This can be informed of the driver by means of a sound or an image.

Moreover, as described previously, the contamination degree, the time, and the volume of the air introduced into the air filter 14 can be respectively obtained by means of the air contamination informing means 110, the air introduction time calculation means 120, and the air introduction volume calculation means 130, and the air contamination degree, the air introduction time, and the air introduction volume are applied differently depending on whether it is operated at the exterior air mode or at the interior air mode of the air conditioning device.

At first, when the air conditioning device is operated at the exterior air mode and the blower 12 is operated at the on state, it is preferable that an atmospheric air contamination degree is applied for the air contamination degree, an operation time of the blower 12 is applied for the air introduction time, and the air introduction volume at the inlet side of the blower 12 is applied for the air introduction volume so as to calculate the dust supply amount along with the introduction of the exterior air.

Also, when the blower 12 is operated at the off state, it is preferable that the atmospheric air contamination degree is applied for the air contamination degree, car driving time during the exterior air mode is applied and when the blower 12 is operated at an off state is applied for the air introduction time, and the air introduction volume caused by the driving wind is applied for the air introduction volume so as to calculate the dust supply amount along with the introduction of the driving wind.

Furthermore, when the air conditioning device is operated at the initial interior air mode and the blower 12 is operated at the on state, it is preferable that the atmospheric air contamination degree is applied for the air contamination degree, the operation time of the blower 12 is applied for the air introduction time, and the air introduction volume at the inlet side of the blower 12 is applied for the air introduction volume so as to calculate the dust supply amount by the estimation that the air contamination degree in the interior of the vehicle is the atmospheric air contamination degree.

Also, when the blower 12 is operated at the on state, but the air conditioning device is not operated at the initial interior air mode, it is preferable that the dust amount passing through the air filter 14 with respect to the interior volume of the vehicle is applied for the air contamination degree, the operation time of the blower 12 is applied for the air introduction time, and the air introduction volume at the inlet side of the blower 12 is applied for the air introduction volume, so as to calculate the dust supply amount by the estimation of the air contamination degree based on the amount of the dust passing through the air filter 14.

Herein, the meaning of the initial interior air mode represents for a case in which the air conditioning device becomes to be operated at the interior air mode for the first time after the operation of the air conditioning device and the blower after the start of the vehicle, and what it means that it is not operated at the initial interior air mode, represents for a case in which the air conditioning device has been operated at the interior air mode already after the start of the vehicle, and the operation of the air conditioning device and the blower 12.

On the other hand, when the device is operated at the interior air mode and the blower 12 is operated at the off state, the dust supply amount becomes to be "zero".

In addition, the dust supply amount (n+1), the dust accumulation amount (n+1), and the total dust accumulation amount (n+1) can be respectively calculated by means of following Expressions 1, 2, 3 and 4.

$$\text{The dust supply amount } (n+1) \text{ (}\mu g\text{)}= \text{contamination degree}(\mu g/m^3) \times \text{air introduction time (hr)} \times \text{air introduction volume } (m^3/hr) \quad (1)$$

$$\text{The dust accumulation amount } (n+1) = \text{dust supply amount } (n+1) \times \text{filter efficiency} \quad (2)$$

$$\text{The total dust accumulation amount } (n+1) = \text{total dust accumulation amount } (n) + \text{dust accumulation amount } (n+1) \quad (3)$$

Herein, the dust accumulation amount (n+1) can be calculated by adding the dust supply amount (n+1) to the dust accumulation amount (n).

When the air conditioning device is operated at the interior air mode, if the blower 12 is not operated at the initial interior air mode, the contamination degree can be calculated by way of the following Expression 4, since the contamination degree is regarded as a amount of the dust passing through the air filter 14, and otherwise, it is preferable to regard the atmospheric air contamination degree as the contamination degree.

$$\text{The air contamination degree} = [\text{dust supply amount } (n) - \text{dust accumulation amount}(n)]/\text{interior volume of the vehicle} \quad (4)$$

Also, as shown in FIG. 5, the efficiency of the air filter 14 is calculated by the following Expression 5, and the dust amount passing through the vehicle (introduction amount into the interior of the vehicle) can be calculated by subtracting the dust accumulation amount from the dust supply amount.

$$\text{The efficiency of the air filter} = \text{dust accumulation amount/dust supply amount} \quad (5)$$

In this instance, when the air introduction volume varies, a dust removal efficiency of the air filter 14 becomes to vary, so that the dust removal efficiency of the air filter 14 according to the air introduction volume can be calculated/applied based on an interrelation expression induced using the data about the respective air introduction volume and the removal efficiency. On the other hand, the dust removal efficiency of the air filter 14 can be calculated by the application of the average efficiency with respect to the dust supply amount as a representative efficiency.

Next, FIG. 6 is a graphic view showing comparisons between a dust accumulation amount of the air filter 14 obtained according to the above calculation expression and a real dust accumulation amount concentrated in the air filter 14 in the device for informing replacement time of the air filter according to the present invention, in which a transverse axis indicates the measurement time with "A" representing for the time directly after the exchange of the air filter (dust accumulation amount is zero), and "K" representing for the replacement time of the air filter (dust accumulation amount=reference value at the replacement time).

In this instance, the longitudinal axis indicates the dust accumulation amount, in which "0.0" represents for the dust accumulation amount directly after the exchange of the air filter, and "1.0" represents for the reference value for informing the replacement time of the air filter.

The above described graphic view shows matching degrees between the data ($\Delta$) obtained by measuring the real dust amount accumulated in the air filter 14 and the data (*) of the dust accumulation amount calculated according to the present invention. In this regard, it can be seen that the real dust accumulation amount is anticipated similarly. Furthermore, the real dust accumulation amount can be accurately anticipated by the correction of an interval between the real measurement line of the weight (dotted line) and the calculation line of the weight (solid line).

Figure 7:
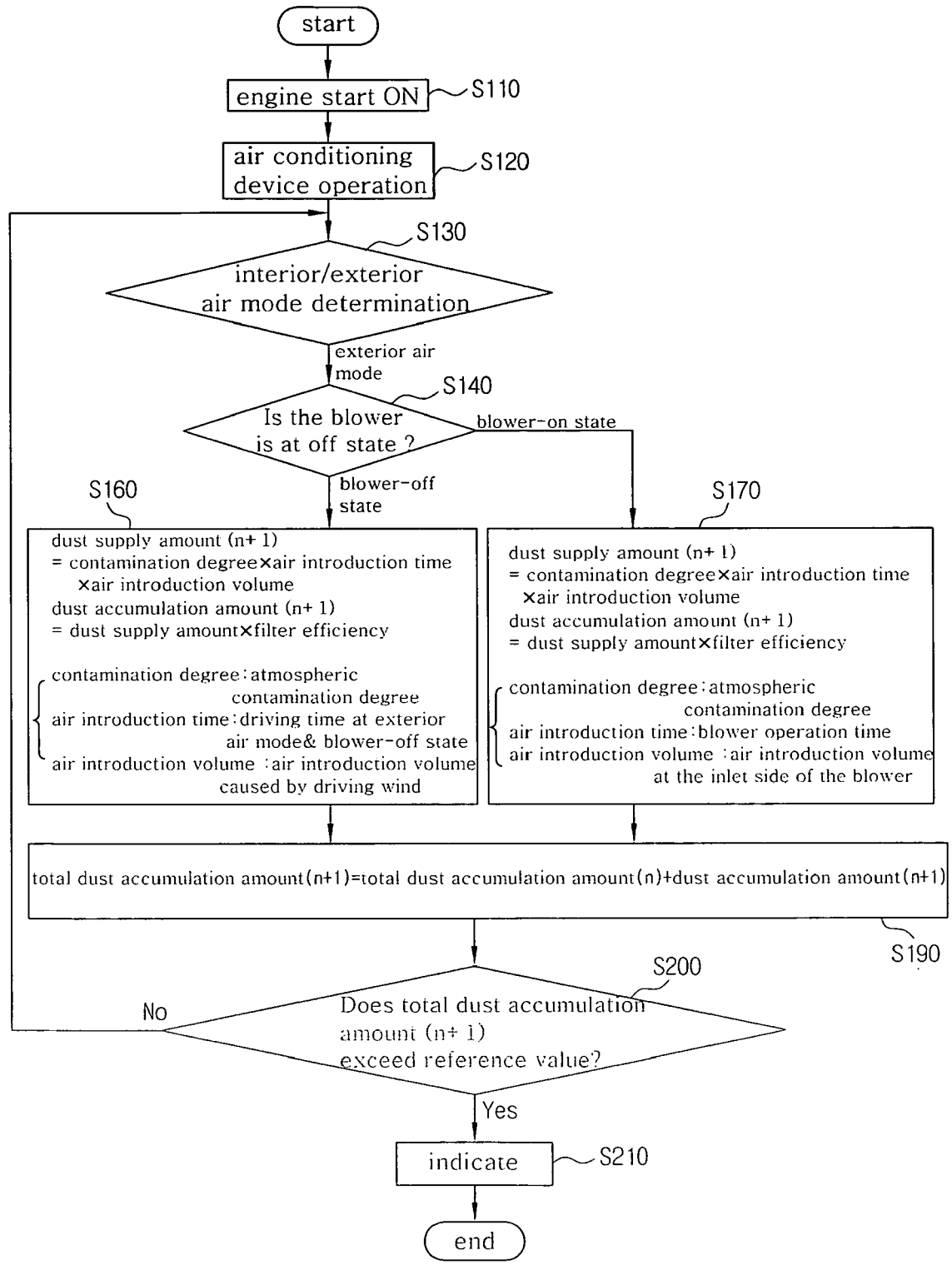
FIG. 7 is a flow chart showing an exterior air mode in a method for informing replacement time of an air filter according to the present invention.
Figure 8:
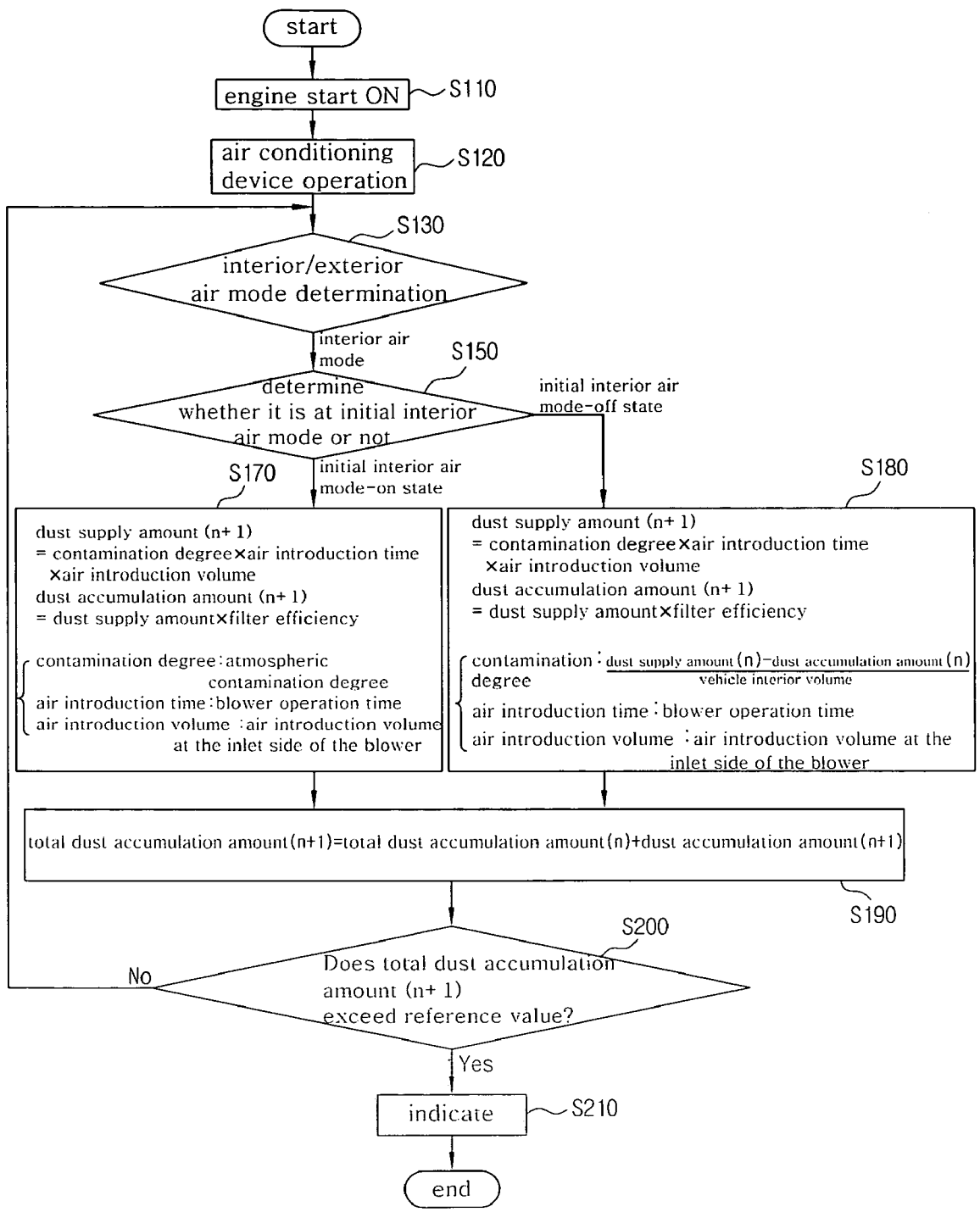
FIG. 8 is a flow chart showing an interior air mode in a method for informing replacement time of an air filter according to the present invention.

Hereinafter, the method of informing replacement time of an air filter according to the present invention will be described. FIG. 7 is a flow chart showing an exterior air mode in a method for informing replacement time of an air filter according to the present invention, and FIG. 8 is a flow chart showing an interior air mode in a method for informing replacement time of an air filter according to the present invention. In the description, explanations overlapping with those of the device for informing replacement time for an air filter will be omitted.

Referring now to FIG. 7 showing the flow of the operation of the present device at the time of the exterior air mode, at first, it is determined whether it is operated at the interior air mode or at the exterior air mode, when the vehicle is started and the air conditioning device is operated (S110, S120, S130).

As a result of the determination, if it is determined to be operated at the exterior air mode, then, it will be determined whether the blower 12 is operated at the on state or at the off state (S140).

Next, according to the result of the determination, they are divided into an on state of the blower 12, and an off state of the blower 12, and then the dust supply amount (n+1) supplied to the air filter 14 and the dust accumulation amount (n+1) concentrated in the air filter 14 are respectively calculated by the application of the expressions 1, and 2 (S160, S170).

In this instance, when the blower 12 is at the on state, the dust supply amount (n+1) and the dust accumulation amount (n+1) concentrated in the air filter 14 can be calculated by applying the atmospheric air contamination degree for the contamination degree, the operation time of the blower 12 for the air introduction time, and the air introduction volume at the inlet side of the blower 12 for the air introduction volume.

Also, when the blower 12 is operated at the off state, the dust supply amount (n+1) and the dust accumulation amount (n+1) concentrated in the air filter 14 can be calculated by applying the atmospheric air contamination degree for the contamination degree, the driving time of the vehicle at the off state of the blower 12 during the exterior air mode for the air introduction time, and the air introduction volume caused by the driving wind of the vehicle for the air introduction volume.

In this instant, the efficiency of the air filter 14 can be calculated by the expression 5. Also, since the dust removal efficiency can be varied if the air introduction volume is varied according to the stage number of the blower 12 or the positions of the temperature control door 20 and the mode door 24, interrelation expression representing the variation of the efficiency of the air filter 14 according to the respective air introduction volume is induced at first, and then the efficiency of the air filter 14 according to the air introduction volume can be calculated/applied by using the induced interrelation expression. In this instance, the efficiency of the air filter 14 can be calculated by applying an average efficiency with respect to the dust supply amount as a representative efficiency.

On the other hand, while the dust accumulation amount (n+1) can be calculated by the expression 2, it can also be calculated by the expression: the dust accumulation amount (n+1)=dust accumulation amount (n)+dust supply amount (n+1).

Then, the total dust accumulation amount (n+1) concentrated in the air filter 14 can be calculated by the expression 3 (S190).

At last, when the calculated total dust accumulation amount (n+1) exceeds the predetermined reference value, the replacement time of the air filter 14 is informed to the outside, otherwise, it returns to the step S130 of determining whether it is operated at the exterior air mode or at the interior air mode (S200, S210).

Next, the operation flow of the air conditioning device at the interior air mode will be described in connection with FIG. 8. It is at first determined whether it is operated at the interior air mode or at the exterior air mode, after the start of the vehicle and the operation of the air conditioning device (S110, S120, S130).

As a result of the determination, if it is determined to be operated at the interior air mode, then, it will be determined whether the blower 12 is operated at an initial interior air mode or not and at the on state (S150).

Next, according to the result of the determination, they are divided into an initial interior air mode of the blower 12 at the on state, and a state in which the blower 12 is operated differently, and then the dust supply amount (n+1) supplied to the air filter 14 and the dust accumulation amount (n+1) concentrated in the air filter 14 are calculated by the application of the expressions 1, and 2 respectively (S170, S180).

In this instance, when the blower 12 is at the initial interior air mode state, the dust supply amount (n+1) and the dust accumulation amount (n+1) concentrated in the air filter 14 can be calculated by applying the atmospheric air contamination degree for the contamination degree, the operation time of the blower 12 for the air introduction time, and the air introduction volume at the inlet side of the blower 12 for the air introduction volume.

Also, when the blower 12 is operated at a non-initial interior air mode state, the dust supply amount (n+1) and the dust accumulation amount (n+1) concentrated in the air filter 14 can be calculated by applying the expression 4 for the contamination degree, the operation time of the blower 12 for the air introduction time, and the air introduction volume at the inlet side of the blower 12 for the air introduction volume.

In this instant, the efficiency of the air filter 14 can be calculated by the expression 5. Also, since the dust removal efficiency can be varied if the air introduction volume is varied according to the stage number of the blower 12 or the positions of the temperature control door 20 and the mode door 24, interrelation expression representing the variation of the efficiency of the air filter 14 according to the respective air introduction volume is induced at first, and then the efficiency of the air filter 14 according to the air introduction volume can be calculated/applied by using the induced interrelation expression. In this instance, the efficiency of the air filter 14 can be calculated by applying an average efficiency with respect to the dust supply amount as a representative efficiency.

On the other hand, while the dust accumulation amount (n+1) can be calculated by the expression 2, it can also be calculated by the expression: the dust accumulation amount (n+1)=dust accumulation amount (n)+dust supply amount (n+1).

Then, the total dust accumulation amount (n+1) concentrated in the air filter 14 can be calculated by the expression 3 (S190).

At last, when the calculated total dust accumulation amount (n+1) exceeds the predetermined reference value, the replacement time of the air filter 14 is informed to the outside, otherwise, it returns to the step S130 of determining whether it is operated at the exterior air mode or at the interior air mode (S200, S210).

According to the present invention, it is possible to replace the air filter at an optimum instance to thereby maintain the pleasant interior circumstance of a vehicle, to prevent the dissipation of the expense caused by the unnecessary early replacement of the air filter, and to prevent the interior air contamination of the vehicle due to the delay of the replacement of the air filter, and the like, by adapting to inform the replacement time of the air filter when the accumulation amount of the total dust in the air filter exceeds a reference value, after calculating and integrating the dust supply amount and the dust accumulation amount of the air filter based on the factors such as a contamination degree of the air introduced into the air filter, an air introduction time, and the air introduction volume.

While the present invention has been described with reference to the particular illustrative embodiments, it is not to be restricted by the embodiments but only by the appended claims. Also, it is to be appreciated that those skilled in the art can change or modify the embodiments without departing from the scope and spirit of the present invention.

What is claimed is:

1. A device for informing replacement time of an air filter in an air conditioning device for a vehicle, which includes a blower provided with an exterior/interior air switching door at the inside to selectively open and close interior/exterior air inlet openings formed at the inlet side according to interior/exterior air modes, and a blower for blowing the air introduced through the interior/exterior air inlet openings to a air conditioning case, and an air filter disposed at least one place of upstream and downstream of the blower, wherein the device further comprises:

an air contamination informing means for providing a contamination degree of air introduced into the air filter before the air passes through the air filter;

an air introduction time calculation means for calculating a time spent for the air to be introduced into the air filter;

an air introduction volume calculation means for calculating a volume of the air introduced into the air filter;

an indicating means for informing replacement time of the air filter; and a controller for calculating and integrating dust supply amount and dust accumulation amount of the air filter based on factors such as values provided from the air contamination informing means, the air introduction time calculation means, and the air introduction volume calculation means, and then informing the replacement time of the air filter by way of the indicating means when the total dust accumulation amount of the air filter exceeds a reference value.

2. The device according to claim 1, wherein an atmospheric contamination degree is applied for the contamination degree, an operation time of the blower is applied for the air introduction time, and an air introduction volume at the inlet side of the blower is applied for the air introduction volume, in case of the exterior air mode, and when the blower is operated at an on state.

3. The device according to claim 1, wherein an atmospheric contamination degree is applied for the contamination degree, driving time of vehicles is applied for the air introduction time, and air introduction volume at the inlet side of the blower is applied for the air introduction volume, in case of the exterior air mode, and when the blower is operated at an off state.

4. The device according to claim 1, wherein an atmospheric contamination degree is applied for the contamination degree, an operation time of the blower is applied for the air introduction time, and an air introduction volume at the inlet side of the blower is applied for the air introduction volume, when the blower is operated at an on state and at initial interior air mode.

5. The device according to claim 1, wherein a dust amount passing through the air filter with respect to the vehicle interior volume is applied for the contamination degree, an operation time of the blower is applied for the air introduction time, and an air introduction volume at the inlet side of the blower is applied for the air introduction volume, when the blower is operated at on state and at a non-initial interior air mode state.

6. The device according to claim 1, wherein a dust supply amount (n+1), a dust accumulation amount (n+1), and a total dust accumulation amount (n+1) are calculated according to following Expressions:

dust supply amount $(n+1)$=contamination degree×air introduction time+air introduction volume, dust accumulation amount $(n+1)$=dust supply amount $(n+1)$×filter efficiency, total dust accumulation amount $(n+1)$=total dust accumulation amount $(n)$+dust accumulation amount $(n+1)$.

7. The device according to claim 5, wherein the contamination degree is calculated by the following Expression:

contamination degree=(dust supply amount−dust accumulation amount)/vehicle interior volume.

8. The device according to claim 2, wherein an annual average atmospheric contamination degree at a driving area of the vehicle is applied for the atmospheric contamination degree.

9. The device according to claim 3, wherein an annual average atmospheric contamination degree at a driving area of the vehicle is applied for the atmospheric contamination degree.

10. A method of informing replacement time of an air filter in an air conditioning device for a vehicle, which includes a blower provided with an exterior/interior air switching door at the inside to selectively open and close interior/exterior air inlet openings formed at the inlet side according to interior/exterior air modes, and a blower for blowing the air introduced through the interior/exterior air inlet openings to a air conditioning case, and an air filter disposed at least one place of upstream and downstream of the blower, wherein the method comprises the steps of:

determining whether it is operated at an interior air mode or at an exterior air mode, when the vehicle is started and the air conditioning device is operated;

determining whether the interior air mode is at an initial interior air mode or not after the operation of the blower, when the result of determination is that it is operated at the interior air mode, and determining whether the blower is operated at an on state or at an off state if the result of the determination is that it is operated at the exterior air mode;

calculating a supply amount (n+1) of dust introduced into the air filter and an accumulation amount (n+1) of dust concentrated in the air filter by following Expressions, after dividing results of the determination into an initial interior air mode state and a non-initial interior air mode in the interior air mode, a blower-on state and a blower-off state in the exterior air mode:

dust supply amount $(n+1)$=contamination degree×air introduction time×air introduction volume, dust accumulation amount $(n+1)$=dust supply amount $(n+1)$×filter efficiency;

calculating a total dust accumulation amount (n+1) written by the following Expression by the application of the calculated dust accumulation amount (n+1):

total dust accumulation amount $(n+1)$=total dust accumulation amount $(n)$+dust accumulation amount $(n+1)$; and informing replacement time of an air filter when the calculated total dust accumulation amount (n+1) exceeds a reference value.

11. The method according to claim 10, wherein an atmospheric contamination degree is applied for the contamination degree, an operation time of the blower is applied for the air introduction time, and an air introduction volume at the inlet side of the blower is applied for the air introduction volume, in case of the exterior air mode, and when the blower is operated at an on state.

12. The method according to claim 10, wherein an atmospheric contamination degree is applied for the contamination degree, driving time of vehicles is applied for the air introduction time, and air introduction volume at the inlet side of the blower is applied for the air introduction volume, in case of the exterior air mode, and when the blower is operated at an off state.

13. The method according to claim 10, wherein an atmospheric contamination degree is applied for the contamination degree, an operation time of the blower is applied for the air introduction time, and an air introduction volume at the inlet side of the blower is applied for the air introduction volume, when the blower is operated at an on state and at initial interior air mode.

14. The method according to claim 10, wherein a dust amount passing through the air filter with respect to the vehicle interior volume is applied for the contamination degree, an operation time of the blower is applied for the air introduction time, and an air introduction volume at the inlet side of the blower is applied for the air introduction volume, when the blower is operated at an on state and at a state other than the initial interior air mode.

15. The method according to claim 14, wherein the contamination degree is calculated by the following Expression:

contamination degree=(dust supply amount−dust accumulation amount)/vehicle interior volume.

16. The method according to claim 11, wherein an annual average atmospheric contamination degree at a driving area of the vehicle is applied for the atmospheric contamination degree.

17. The method according to claim 12, wherein an annual average atmospheric contamination degree at a driving area of the vehicle is applied for the atmospheric contamination degree.

* * * * *